United States Patent
Song

(10) Patent No.: US 11,521,605 B2
(45) Date of Patent: Dec. 6, 2022

(54) VIDEO-AIDED UNSUPERVISED GRAMMAR INDUCTION

(71) Applicant: TENCENT AMERICA LLC, Palo Alto, CA (US)

(72) Inventor: Linfeng Song, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 62 days.

(21) Appl. No.: 17/181,412

(22) Filed: Feb. 22, 2021

(65) Prior Publication Data

US 2022/0270596 A1    Aug. 25, 2022

(51) Int. Cl.
| | | |
|---|---|---|
| G10L 15/00 | (2013.01) | |
| G10L 15/197 | (2013.01) | |
| G10L 15/06 | (2013.01) | |
| G10L 15/18 | (2013.01) | |
| G06V 20/40 | (2022.01) | |

(52) U.S. Cl.
CPC ............ G10L 15/197 (2013.01); G06V 20/46 (2022.01); G10L 15/063 (2013.01); G10L 15/1822 (2013.01); *G10L 2015/0635* (2013.01)

(58) Field of Classification Search
CPC . G10L 15/197; G10L 15/063; G10L 15/1822; G10L 2015/0635; G06V 20/46
See application file for complete search history.

(56) References Cited

U.S. PATENT DOCUMENTS

| | | | |
|---|---|---|---|
| 2014/0236571 A1 | 8/2014 | Quirk et al. | |
| 2014/0369596 A1* | 12/2014 | Siskind | G06F 16/7837 |
| | | | 382/158 |
| 2019/0303797 A1* | 10/2019 | Javali | G09B 19/06 |
| 2020/0251091 A1 | 8/2020 | Zhao | |

OTHER PUBLICATIONS

International Search Report dated Mar. 3, 2022 from the International Searching Authority in International Application No. PCT/US2021/063787.

Written Opinion dated Mar. 3, 2022 from the International Searching Authority in International Application No. PCT/US2021/063787.

\* cited by examiner

*Primary Examiner* — Edgar X Guerra-Erazo
*Assistant Examiner* — Philip H Lam
(74) *Attorney, Agent, or Firm* — Sughrue Mion, PLLC

(57) ABSTRACT

A method of training a natural language neural network comprises obtaining at least one constituency span; obtaining a training video input; applying a multi-modal transform to the video input, thereby generating a transformed video input; comparing the at least one constituency span and the transformed video input using a compound Probabilistic Context-Free Grammar (PCFG) model to match the at least one constituency span with corresponding portions of the transformed video input; and using results from the comparison to learn a constituency parser.

20 Claims, 4 Drawing Sheets

Fig. 4

| Method | | DiDeMo | | | | | YouCook2 | | MSRVTT | |
|---|---|---|---|---|---|---|---|---|---|---|
| | | NP | VP | PP | C-F1 | S-F1 | C-F1 | S-F1 | C-F1 | S-F1 |
| | LBranch | 42.2 | 0.1 | 0.1 | 16.4 | 18.6 | 6.8 | 5.9 | 15.0 | 17.1 |
| | RBranch | 33.2 | 92.0 | 67.5 | 54.3 | 57.7 | 35.3 | 41.8 | 55.7 | 59.2 |
| | Random | $37.2_{\pm 0.3}$ | $31.1_{\pm 0.3}$ | $30.5_{\pm 0.3}$ | $29.9_{\pm 0.3}$ | $32.9_{\pm 0.0}$ | $21.3_{\pm 0.2}$ | $24.2_{\pm 0.4}$ | $28.1_{\pm 0.1}$ | $30.9_{\pm 0.1}$ |
| | C-PCFG | $72.3_{\pm 5.9}$ | $16.5_{\pm 6.1}$ | $22.5_{\pm 16.2}$ | $37.7_{\pm 5.5}$ | $39.9_{\pm 4.7}$ | $39.5_{\pm 5.0}$ | $42.9_{\pm 5.0}$ | $51.9_{\pm 3.3}$ | $55.5_{\pm 3.2}$ |
| VC-PCFG | ResNeXt | $64.7_{\pm 21.5}$ | $25.8_{\pm 17.6}$ | $34.7_{\pm 25.1}$ | $40.1_{\pm 13.8}$ | $41.9_{\pm 14.0}$ | $38.4_{\pm 8.4}$ | $42.9_{\pm 8.4}$ | $51.9_{\pm 1.9}$ | $55.4_{\pm 2.3}$ |
| | SENet | $70.8_{\pm 15.3}$ | $25.8_{\pm 16.0}$ | $36.7_{\pm 24.7}$ | $42.8_{\pm 10.5}$ | $44.0_{\pm 10.4}$ | $40.1_{\pm 8.7}$ | $45.1_{\pm 8.3}$ | $53.4_{\pm 1.2}$ | $56.6_{\pm 1.6}$ |
| | I3D | $58.1_{\pm 13.5}$ | $46.0_{\pm 14.2}$ | $46.0_{\pm 17.3}$ | $45.4_{\pm 5.9}$ | $49.3_{\pm 6.0}$ | $40.9_{\pm 3.6}$ | $45.9_{\pm 3.3}$ | $55.8_{\pm 1.5}$ | $59.7_{\pm 1.6}$ |
| | R2P1D | $61.3_{\pm 8.6}$ | $38.3_{\pm 5.5}$ | $62.4_{\pm 4.1}$ | $48.3_{\pm 4.4}$ | $50.8_{\pm 4.2}$ | $39.7_{\pm 8.2}$ | $44.6_{\pm 8.4}$ | $55.2_{\pm 2.4}$ | $58.6_{\pm 2.3}$ |
| | S3DG | $61.5_{\pm 13.5}$ | $32.0_{\pm 16.9}$ | $51.9_{\pm 8.0}$ | $44.3_{\pm 2.7}$ | $46.5_{\pm 5.2}$ | $39.6_{\pm 6.6}$ | $44.2_{\pm 6.6}$ | $52.0_{\pm 3.2}$ | $55.2_{\pm 2.9}$ |
| | Scene | $62.4_{\pm 9.7}$ | $30.8_{\pm 12.4}$ | $41.4_{\pm 25.0}$ | $41.9_{\pm 6.5}$ | $44.9_{\pm 7.4}$ | – | – | $55.9_{\pm 1.5}$ | $58.9_{\pm 1.3}$ |
| | Audio | $64.5_{\pm 18.7}$ | $21.4_{\pm 26.8}$ | $34.9_{\pm 11.0}$ | $38.9_{\pm 3.7}$ | $39.6_{\pm 5.2}$ | $39.4_{\pm 4.8}$ | $43.5_{\pm 4.9}$ | $54.0_{\pm 1.6}$ | $57.2_{\pm 1.5}$ |
| | OCR | $64.7_{\pm 15.1}$ | $27.6_{\pm 19.7}$ | $43.0_{\pm 31.3}$ | $42.2_{\pm 17.0}$ | $44.7_{\pm 17.6}$ | $38.9_{\pm 5.5}$ | $43.4_{\pm 5.6}$ | $52.4_{\pm 3.1}$ | $56.1_{\pm 3.0}$ |
| | Face | $60.9_{\pm 16.1}$ | $31.7_{\pm 17.2}$ | $53.0_{\pm 9.8}$ | $44.1_{\pm 4.5}$ | $46.4_{\pm 5.6}$ | – | – | $51.6_{\pm 2.7}$ | $55.0_{\pm 2.6}$ |
| | Speech | $62.0_{\pm 12.8}$ | $26.8_{\pm 17.8}$ | $44.0_{\pm 34.7}$ | $41.1_{\pm 16.1}$ | $43.2_{\pm 16.1}$ | – | – | $53.5_{\pm 2.6}$ | $57.4_{\pm 2.4}$ |
| | Concat | $68.8_{\pm 8.6}$ | $25.0_{\pm 20.1}$ | $39.8_{\pm 19.5}$ | $42.3_{\pm 12.4}$ | $43.3_{\pm 14.2}$ | $42.6_{\pm 5.8}$ | $47.2_{\pm 5.6}$ | $51.1_{\pm 4.2}$ | $54.7_{\pm 4.1}$ |
| MMC-PCFG | | $68.0_{\pm 9.9}$ | $52.7_{\pm 9.0}$ | $63.8_{\pm 8.7}$ | $55.3_{\pm 3.7}$ | $59.0_{\pm 3.4}$ | $45.3_{\pm 5.7}$ | $49.3_{\pm 6.1}$ | $57.3_{\pm 1.3}$ | $60.6_{\pm 1.2}$ |

Table 1: Performance comparison on three benchmark datasets.

VIDEO-AIDED UNSUPERVISED GRAMMAR INDUCTION

FIELD

Embodiments of the disclosure relate to automatic speech recognition, and in particular to a neural network training method and apparatus, a computer device, and a storage medium.

BACKGROUND OF THE INVENTION

Constituency parsing is an important task in natural language processing. Constituency parsing aims to capture syntactic information in sentences in the form of constituency parsing trees. Conventional approaches to constituency parsing involve human-annotated datasets. However, annotating syntactic trees by human language experts is expensive and time-consuming. Further, these "supervised" approaches are generally limited to several major languages. In addition, generally, the treebanks for training these supervised parsers are small in size and restricted to the newswire domain, thus their performances tend to be worsened when applying to other domains.

To address these issues, the recent approach has been to design "unsupervised" constituency parsers and grammar inducers, since they can be trained on large-scale unlabeled data. In particular, there has been growing interests in exploiting visual information for unsupervised grammar induction because visual information captures many sources of information required for language learning that textual information lacks. Thus, a recent goal has been to learn a constituency parser from raw unlabeled text aided by its visual context.

Previously, methods used to train sentencing parsing involved exploiting object information from images. Examples of these previous methods are described in Non-Patent Literature [1], Yanpeng Zhao and Ivan Titov. Visually grounded compound PCFGs. EMNLP. 2020; Non-Patent Literature [2], Haoyue Shi, Jiayuan Mao, Kevin Gimpel, and Karen Livescu. Visually grounded neural syntax acquisition. ACL. 2019; and other Probabilistic Context-Free Grammar Visually-Grounded Compound (VC-PCFGs) models.

However, since images are static they cannot present the dynamic interactions among visual objects, which usually correspond to verb phrases that carry important information. Therefore, images and their descriptions may not be fully-representative of all linguistic phenomena encountered in learning, especially when action verbs are involved.

SUMMARY OF THE INVENTION

Embodiments of the instant disclosure may address the above problems by leveraging video content to provide for an improved unsupervised grammar induction model. In particular, embodiments of the disclosure may exploit the current state-of-the-art techniques in both video and audio understanding, domains of which include object, motion, scene, face, optical character, sound, and speech recognition. Embodiments of the disclosure involve extraction of features from corresponding state-of-the-art models and analyzing their usefulness with a VC-PCF model. Since different modalities may correlate with each other, independent modeling of each may be sub-optimal. Embodiments of the disclosure also provide a novel model, Multi-Modal Compound Probabilistic Context-Free Grammars (MMC-PCFG), to better model correlation(s) among these modalities.

Embodiments of the disclosure have been found by investigating video-aided grammar induction, which learns a constituency parser from both unlabeled text and its corresponding video. As described above, existing methods of multi-modal grammar induction focus on grammar induction from text-image pairs. Promising results have shown that information from static images may be useful in induction. However, videos provide even richer information, including not only static objects but also actions and state changes useful for inducing verb phrases. Embodiments of the disclosure involve the exploration of rich features (e.g., action, object, scene, audio, face, OCR (optical character recognition) and speech) from videos, and may involve the recent Compound PCFG model described in Non-Patent Literature [3], Yoon Kim, Chris Dyer, and Alexander M Rush. Compound probabilistic context-free grammars for grammar induction. ACL. 2019, as a baseline.

Embodiments of the disclosure also provide a Multi-Modal Compound PCFG model (MMC-PCFG) to effectively aggregate these rich features from different modalities. According to embodiments of the disclosure, the MMC-PCFG model may be trained end-to-end and outperforms each individual modality and previous state-of-the-art systems on three benchmarks, confirming the effectiveness of leveraging video information for unsupervised grammar induction.

BRIEF DESCRIPTION OF THE DRAWINGS

FIG. 4 depicts TABLE 1, which presents a performance comparison on benchmark datasets

DETAILED DESCRIPTION OF THE INVENTION

Grammar induction and unsupervised parsing has been a long-standing problem in computational linguistics. Recently, neural networks have been utilized in predicting constituency structures with no supervision. This has shown promising results. In addition to learning purely from text, there is a growing interest to use image information to improve accuracy of induced constituency trees. However, images are static and cannot present the dynamic interactions among visual objects, which usually correspond to verb phrases that carry important information.

Embodiments disclosed herein may address this problem by leveraging video content (including sound content) to improve an unsupervised grammar induction model.

As opposed to conventional models and understanding, embodiments of the instant disclosure may improve the constituency parser by using videos containing richer information than images.

That is, embodiments of the disclosure address video aided unsupervised grammar induction and demonstrate that verb related features extracted from videos may be beneficial to parsing.

The inventors have thoroughly tested and analyzed different modalities of video content, and now propose embodiments including a model to effectively integrate these important modalities to better train constituency parsers. Experimental results demonstrate the effectiveness of the embodiments over previous state-of-the-art methods.

Relevant to embodiments of the disclosure are multi-modal compound PCFGs (MMC-PCFG). Instead of purely relying on object information from images, embodiments of the disclosure may generalize VC-PCFG into the video domain, where multi-modal video information is considered. Relevant to embodiments, the disclosure will first introduce video representation, then describe the procedure for matching the multi-modal video representation with each span, then training and inference details will be described.

Figure 1:
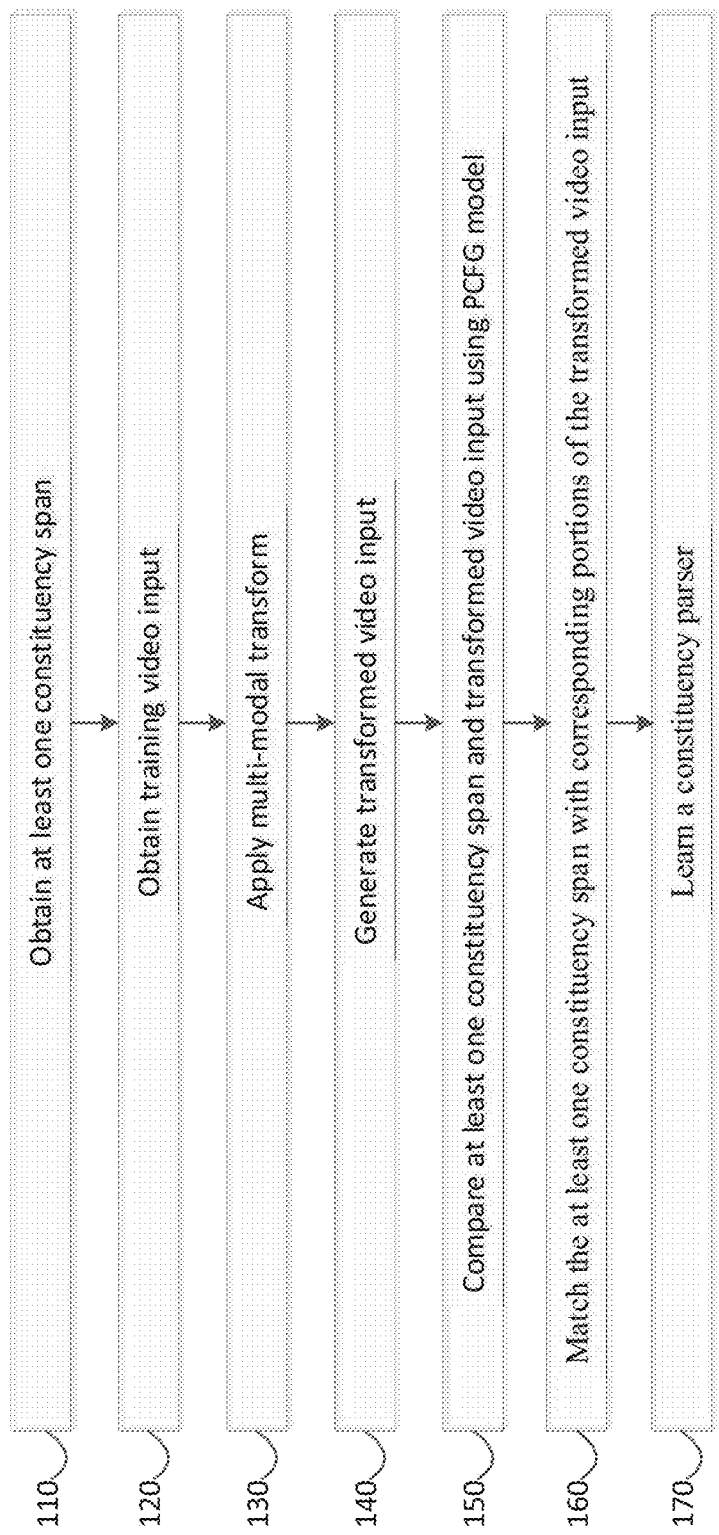
FIG. 1 is a flow chart of an example process for performing a natural language neural network training method.

FIG. 1 is a flow chart of an example process 100 for performing a natural language neural network training method, according to embodiments. This process will be explain in detail below.

Figure 2:
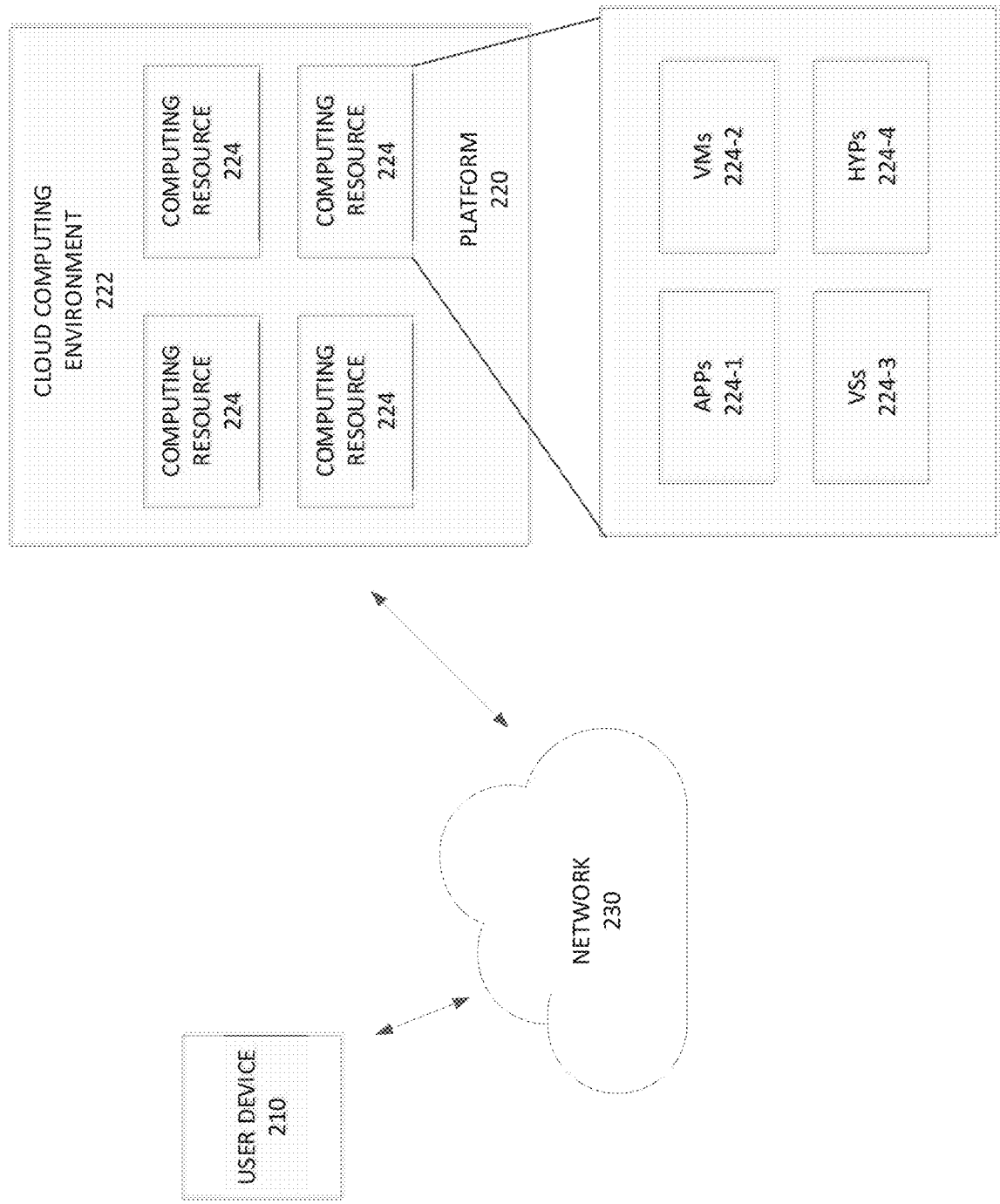
FIG. 2 is a diagram of an example environment in which systems and/or methods, described herein, may be implemented.

In some implementations, one or more process blocks of FIG. 1 may be performed by platform 220, depicted in FIG. 2. In some implementations, one or more process blocks of FIG. 1 may be performed by another device or a group of devices separate from or including platform 220, such as user device 210, also depicted in FIG. 2.

Multi-Modal Compound PCFGs:

A video is a frame sequence, denoted as $V=\{v_i\}_{i=1}^{L^0}$, $v_i$ represents a frame in a video and $L^0$ is the total number of frames. Embodiments may involve the extraction of a video representation from M models trained on different tasks, which are called experts. Each expert extracts a feature sequence. In order to project different expert features into a common dimension, feature sequences are then feed into linear layers (one per expert) with same a output dimension. The mth expert's output after projection may be defined as $F^m=\{f_i^m\}_{i=1}^{L^m}$, where $f_i^m$ and $L^m$ are the ith feature and the total number of features of the mth expert.

A simple method may involve averaging each feature along the temporal dimension and then concatenating them together. However, this would ignore the relations among different modalities and the temporal ordering within each modality.

Accordingly, embodiments disclosed herein use a multi-modal transformer to collect video representations. The multi-modal transformer expects a sequence as input, hence all feature sequences may be concatenated together and take the form:

$$X=[f_{avg}^1, f_1^1, \ldots, f_{L_1}^1, \ldots, f_{avg}^M, f_1^M, \ldots, f_{L_M}^M],$$

where $f_{avg}^m$ is the averaged feature of $\{f_i^m\}_i^{L_m}$. Each transformer layer has a standard architecture and consists of a multi-head self-attention module and a feed forward network (FFN). Since this architecture is permutation-invariant, embodiments may supplement it with expert type embeddings E and a positional encoding P that are added to the input of each attention layer. The expert type embeddings indicate the expert type for input features and take the form:

$$E=[e^1,e^1,\ldots,e^1,\ldots,e^M,e^M,\ldots,e^M],$$

where $e^m$ is a learned embedding for the mth expert. The positional encodings indicate the location of each feature within the video and take the form:

$$P=[p_0,p_1,\ldots,p_{L_1},\ldots,p_0,p_1,\ldots,p_{L_M}],$$

where fixed encodings are used. After that, embodiments involve the collection of an output of a transformer that corresponds to the averaged features as the final video representation. In this way, video representation can be learned more effectively by modeling correlations of features from different modalities and different timestamps.

Video-Text Matching:

To compute the similarity between a video V and a particular span c, a span representation c may be obtained and projected to M separate expert embeddings via gated embedding modules (one per expert), denoted as $\Xi=\{\xi^i\}_{i=1}^M$. The video-span similarity is computed as following, $$\omega_i(c) = \frac{\exp(u_i^\top c)}{\sum_{j=1}^M \exp(u_j^\top c)},$$

$$o(\Xi, \Psi) = \sum_{i=1}^M \omega_i(c)\cos(\xi^i, \psi^i),$$

where $\{u_i\}_{i=1}^M$ are learned weights. Given $\Xi'$, an unmatched span expert embedding of $\Psi$, and $\Psi'$, an unmatched video representation of $\Xi$, the hinge loss for video is given by:

$$h_{vid}(\Xi,\Psi)=E_{c'}[o(\Xi',\Psi)-o(\Xi,\Psi)+\epsilon]_+ + E_{\Psi'}[o(\Xi,\Psi')-o(\Xi,\Psi)+\epsilon]_+$$

where $\epsilon$ is a positive margin. Finally, the video-text matching loss may be defined as:

$$s_{vid}(V,\sigma)=\Sigma E_{c\in c}p(c|\sigma)h_{vid}(\Xi,\Psi)$$

Training and Inference:

During training, the model according to embodiments may be optimized by the $\mathrm{ELBO}$ and the video-text matching loss:

$$L(\phi,\theta)=\Sigma_{(V,\sigma)\in\Omega}-\text{ELBO}(\sigma;\phi,\theta)+\alpha s_{vid}(V,\sigma),$$

where $\alpha$ is a hyper-parameter balancing these two loss terms and $\Omega$ is a video-sentence pair.

During inference, embodiments predict the most likely tree t* given a sentence σ without accessing videos. Since computing the integral over z is intractable, t* is estimated with the following approximation, $$t^*=\arg\max_t \int_z p_\theta(t|z)p_\theta(z|\sigma)dz \approx \arg\max_t p_\theta(t|\sigma,\mu_\phi(\sigma))$$

where $\mu_\phi(\sigma)$ is the mean vector of the variational posterior $q_\theta(z|\sigma)$ and t* can be obtained using the Cocke-Younger-Kasami (CYK) algorithm.

Advantages of Embodiments

The inventors have evaluated the proposed MMC-PCFG approach according to embodiments on three datasets, and compared it with recently proposed state-of-the-art methods, including Compound PCFGs (C-PCFGs) and VC-PCFGs The results are summarized in TABLE 1, Depicted in FIG. 4.

As shown in TABLE 1, FIG. 4, the models' recalls on top-3 frequent phrase types (NP, VP and PP) were compared. These three types cover 77.4%, 80.1% and 82.4% spans of gold trees on DiDeMo, YouCook2 and MSRVTT, respectively. As shown the MMC-PCFG models according to the embodiments unexpectedly and surprisingly outperform all baselines on C-F1 and S-F1 in all datasets.

FIG. 2 is a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of performing hierarchical image processing, as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210 and/or sensor device 220. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
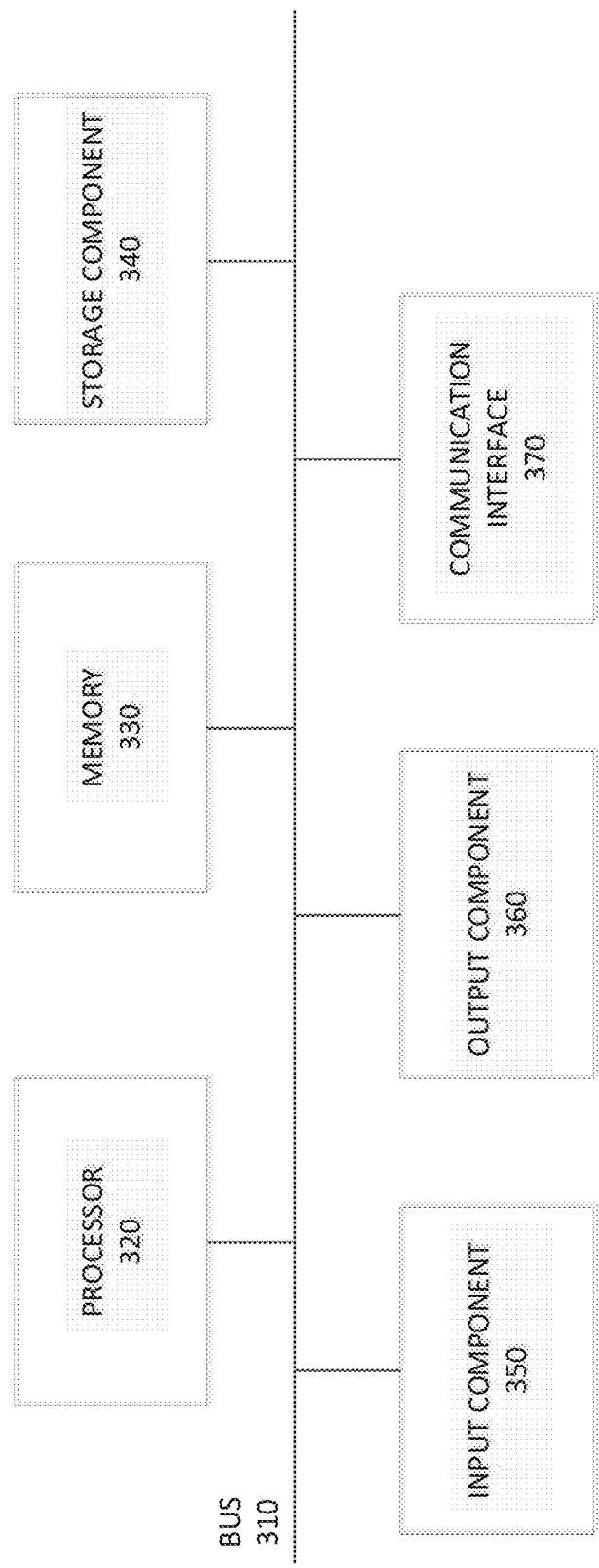
FIG. 3 is a diagram of example components of one or more devices of FIG. 2.

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

As described above. FIG. 1 is a flow chart of an example process for performing a natural language neural network training method. In some implementations, one or more process blocks of FIG. 1 may be performed by platform 220. In some implementations, one or more process blocks of FIG. 1 may be performed by another device or a group of devices separate from or including platform 220, such as user device 210.

As shown in FIG. 1, process 100 may include obtaining at least one constituency span (block 110).

As further shown in FIG. 1, the process 100 may further include obtaining a training video input (block 120).

As further shown in FIG. 1, the process 100 may further include applying a multi-modal transform to the video input (block 130).

As further shown in FIG. 1, the process 100 may further include generating a transformed video input (block 140).

As further shown in FIG. 1, the process 100 may further include comparing the at least one constituency span and the transformed video input using a compound Probabilistic Context-Free Grammar (PCFG) model (block 150).

As further shown in FIG. 1, the process 100 may further include matching the at least one constituency span with corresponding portions of the transformed video input (block 160).

As further shown in FIG. 1, the process 100 may further include using results from the comparison to learn a constituency parser (block 170).

Although FIG. 1 shows example blocks of process 100, in some implementations, process 100 may include additional blocks, fewer blocks, different blocks, or differently arranged blocks than those depicted in FIG. 1. Additionally, or alternatively, two or more of the blocks of process 100 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

What is claimed is:

1. A natural language neural network training method, performed by a computer device, the method comprising:
   obtaining at least one constituency span;
   obtaining a training video input;
   applying a multi-modal transform to the video input, thereby generating a transformed video input;
   comparing the at least one constituency span and the transformed video input using a compound Probabilistic Context-Free Grammar (PCFG) model to match the at least one constituency span with corresponding portions of the transformed video input; and
   using results from the comparison to learn a constituency parser, wherein the at least one constituency span and the transformed video input are compared according to the following formulas:

$$\omega_i(c) = \frac{\exp(u_i^\top c)}{\sum_{j=1}^{M} \exp(u_j^\top c)}, \text{ and}$$

$$o(\Xi, \Psi) = \sum_{i=1}^{M} \omega_i(c)\cos(\xi^i, \psi^i),$$

where c is a representation of the constituency span, M is an expert embedding projected via a gated embedding module, denoted as $\Xi=\{\xi^i\}_{i=1}^{M}, \{u_i\}_{i=1}^{M}$ are learned weights, and $\Xi'$ is an unmatched span expert embedding of $\Psi$, and $\Psi'$.

2. The natural language neural network training method according to claim 1, wherein after obtaining the training video input, and before the multi-modal transform is applied, the training video input is divided into feature sequence projections (F) according to the formula $F^m=\{f_i^m\}_{i=1}^{L^m}$, where $f_i^m$ and $L^m$ are an ith feature and a total number of features of an mth expert, the expert being an extraction of a video representation from M models trained on different tasks.

3. The natural language neural network training method according to claim 2, wherein the feature sequence projections (F) are used as an input to the multi-modal transform.

4. The natural language neural network training method according to claim 3, wherein the feature sequence projections (F), before being used as the input to the multi-modal transform, are concatenated together and take the form: $X=[f_{avg}^1, f_1^1, \ldots, f_{L_1}^1, \ldots f_{avg}^M, f_1^M, \ldots, f_{L_M}^M]$, where $f_{avg}^m$ is an averaged feature of $\{f_i^m\}_i^{L_m}$.

5. The natural language neural network training method according to claim 1, wherein a hinge loss for the video input is given by $h_{vid}(\Xi, \Psi)=E_{c'}[o(\Xi', \Psi)-o(\Xi, \Psi)+\epsilon]_+ + E_{\Psi'}[o(\Xi, \Psi')-o(\Xi, \Psi)+\epsilon]_+$, where $\epsilon$ is a positive margin.

6. The natural language neural network training method according to claim 5, wherein a video-text matching loss is defined as: $s_{vid}(V, \sigma)=\Sigma_{c\in\sigma}p(c|\sigma)h_{vid}(\Xi, \Psi)$.

7. The natural language neural network training method according to claim 6, wherein the PCFG model is optimized using the following formula: $L(\phi, \theta)=\Sigma_{(V, \sigma)\in\Omega}-ELBO(\sigma; \phi, \theta)+\alpha s_{vid}(V, \sigma)$, where $\alpha$ is a hyper-parameter balancing loss terms and $\Omega$ is a video-sentence pair.

8. The natural language neural network training method according to claim 7, wherein, during inference, the method further includes predicting a most likely tree t* given a sentence $\sigma$ without accessing videos.

9. The natural language neural network training method according to claim 8, wherein t* is estimated with the following approximation: $t^*=\text{argmax}_t \int_z p_\theta(t|z)p_\theta(z|\sigma)dz \approx \text{argmax}_t p_\theta(t|\sigma, \mu_\phi(\sigma))$, where $\mu_\phi(\sigma)$ is a mean vector of a variational posterior $q_\theta(z|\sigma)$ and t* be obtained using a Cocke-Younger-Kasami algorithm.

10. An apparatus for training a natural language neural network, the apparatus comprising:
at least one memory configured to store computer program code; and
at least one processor configured to access the at least one memory and operate according to the computer program code, the computer program code comprising
first obtaining code configured to cause the at least one processor to obtain at least one constituency span;
second obtaining code configured to cause the at least one processor to obtain a training video input;
applying code configured to cause the at least one processor to apply a multi-modal transform to the video input, thereby generating a transformed video input;
comparing code configured to cause the at least one processor to compare the at least one constituency span and the transformed video input using a compound Probabilistic Context-Free Grammar (PCFG) model to match the at least one constituency span with corresponding portions of the transformed video input; and
learning code configured to cause the at least one processor to, using results from the comparison, learn a constituency parser,
wherein the comparing code is configured such that the at least one constituency span and the transformed video input are compared according to the following formulas:

$$\omega_i(c) = \frac{\exp(u_i^\top c)}{\sum_{j=1}^{M} \exp(u_j^\top c)}, \text{ and}$$

$$o(\Xi, \Psi) = \sum_{i=1}^{M} \omega_i(c)\cos(\xi^i, \psi^i),$$

where c is a representation of the constituency span, M is an expert embedding projected via a gated embedding module, denoted as $\Xi=\{\xi^i\}_{i=1}^{M}, \{u_i\}_{i=1}^{M}$ are learned weights, and $\Xi'$ is an unmatched span expert embedding of $\Psi$, and $\Psi'$.

11. The apparatus according to claim 10, wherein the computer program code further comprises dividing code, configured to cause the at least one processor to, after executing the second obtaining code and before executing the applying code, divide the training video input into feature sequence projections (F) according to the formula $F^m=\{f_i^m\}_{i=1}^{L^m}$, where $f_i^m$ and $L^m$ are an ith feature and a total number of features of an mth expert, the expert being an extraction of a video representation from M models trained on different tasks.

12. The apparatus according to claim 11, the dividing code is configured such that the feature sequence projections (F) are used as an input to the applying code.

13. The apparatus according to claim 12, wherein the dividing code is configured such that the feature sequence projections (F), before being used as the input to the applying code, are concatenated together and take the form: $X=[f_{avg}^1, f_1^1, \ldots, f_{L_1}^1, \ldots f_{avg}^M, f_1^M, \ldots, f_{L_M}^M]$, where $f_{avg}^m$ is an averaged feature of $\{f_i^m\}_i^{L_m}$.

14. The apparatus according to claim 10, wherein the comparing code is further configured such that a hinge loss for the video input is given by $h_{vid}(\Xi, \Psi)=E_{c'}[o(\Xi', \Psi)-o(\Xi, \Psi)+\epsilon]_+ + E_{\Psi'}[o(\Xi, \Psi')-o(\Xi, \Psi)+\epsilon]_+$, where $\epsilon$ is a positive margin.

15. The apparatus according to claim 14, wherein the comparing code is further configured such that a video-text matching loss is defined as: $s_{vid}(V, \sigma)=\Sigma_{c\in\sigma}p(c|\sigma)h_{vid}(\Xi, \Psi)$.

16. The apparatus according to claim 15, wherein the comparing code is further configured such that the PCFG model is optimized using the following formula: $L(\phi, \theta)=\Sigma_{(V, \sigma)\in\Omega}-ELBO(\sigma;\phi, \theta)+\alpha s_{vid}(V, \sigma)$, where $\alpha$ is a hyper-parameter balancing loss terms and $\Psi$ is a video-sentence pair.

17. The apparatus according to claim 16, wherein the comparing code is further configured such that during inference, the comparing code causes the at least one processor to predict a most likely tree t* given a sentence σ without accessing videos.

18. A non-transitory computer-readable storage medium storing instructions that cause at least one processor to:
  obtain at least one constituency span;
  obtain a training video input;
  apply a multi-modal transform to the video input, thereby generating a transformed video input;
  compare the at least one constituency span and the transformed video input using a compound Probabilistic Context-Free Grammar (PCFG) model to match the at least one constituency span with corresponding portions of the transformed video input; and
  using results from the comparison, learn a constituency parser,
  wherein the at least one constituency span and the transformed video input are compared according to the following formulas:

$$\omega_i(c) = \frac{\exp(u_i^\top c)}{\sum_{j=1}^{M} \exp(u_j^\top c)}, \text{ and}$$

$$o(\Xi, \Psi) = \sum_{i=1}^{M} \omega_i(c)\cos(\xi^i, \psi^i),$$

where c is a representation of the constituency span, M is an expert embedding projected via a gated embedding module, denoted as $\Xi=\{\xi^i\}_{i=1}^{M}$, $\{u_i\}_{i=1}^{M}$ are learned weights, and Ξ' is an unmatched span expert embedding of Ψ, and Ψ'.

19. The natural language neural network training method according to claim 4, wherein architecture of the multi-modal transform is permutation-invariant.

20. The apparatus according to claim 13, wherein architecture of the multi-modal transform is permutation-invariant.

* * * * *